(12) United States Patent
Pappalardo et al.

(10) Patent No.: US 7,035,623 B2
(45) Date of Patent: Apr. 25, 2006

(54) SYSTEM AND METHOD FOR CREATING A NOTE RELATED TO A PHONE CALL

(75) Inventors: Susan E. Pappalardo, Kirkland, WA (US); Jason William Fuller, Bellevue, WA (US); Greg A. Keyser, Sammamish, WA (US); Joel P. Dehlin, Redmond, WA (US); Peter G. Chin, Seattle, WA (US); Debbie Miu Yan Yau, Newcastle, WA (US); Marc W. Todd, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/046,027

(22) Filed: Jan. 28, 2005

(65) Prior Publication Data

US 2005/0130643 A1    Jun. 16, 2005

Related U.S. Application Data

(62) Division of application No. 10/061,397, filed on Feb. 1, 2002, now Pat. No. 6,950,648.

(51) Int. Cl.
*H04Q 7/20*    (2006.01)

(52) U.S. Cl. .................................. 455/412.1; 455/418
(58) Field of Classification Search ............ 455/412.1, 455/418, 566
See application file for complete search history.

(56) References Cited

U.S. PATENT DOCUMENTS

| 5,065,309 | A | * | 11/1991 | Putnam et al. | ......... | 379/110.01 |
| 5,734,706 | A | * | 3/1998 | Windsor et al. | ....... | 379/142.01 |
| 6,442,251 | B1 | * | 8/2002 | Maes et al. | .............. | 379/93.23 |
| 6,795,429 | B1 | * | 9/2004 | Schuster et al. | ............ | 370/352 |

* cited by examiner

*Primary Examiner*—Erika A. Gary
(74) *Attorney, Agent, or Firm*—Merchant & Gould P.C.; Ryan T. Grace

(57) ABSTRACT

This invention is directed toward a computer-implemented system and method for creating a note in a mobile communication device. The method includes creating a call note if a phone call is in progress. The call note includes call data that are related to the phone call. The call note is also associated with an entry in a call log. The method may be implemented by computer-executable components loaded into the memory of a mobile communication device.

19 Claims, 8 Drawing Sheets

SYSTEM AND METHOD FOR CREATING A NOTE RELATED TO A PHONE CALL

This application claims the benefit of divisional application Ser. No. 10/061,397, filed Feb. 1, 2002 now U.S. Pat. No. 6,950,648, the benefit of the earlier filing date is hereby claimed under 35 U.S.C. § 120.

FIELD OF THE INVENTION

This invention relates generally to mobile computing, and more particularly to document management within a mobile computing device.

BACKGROUND OF THE INVENTION

Manufacturers are continually adding additional applications to mobile communication devices, such as mobile telephones, in order to meet an increasing demand for a multi-functional device. For example, mobile telephones are increasingly becoming more than just wireless voice communication devices. Rather, in addition to handling voice data, some mobile telephones have a display unit to display graphical data to support email, Web browsing, and other non-voice features.

Similarly, manufacturers of mobile computing devices, such as personal digital assistants (PDAs), continue to add communication features to their computing devices. For example, PDAs that are currently available have features that enable them to have a data communication link with the Internet for sending and receiving emails, browsing the web, and so on.

Presently, a few manufacturers have attempted to advance mobile electronic device technology one step further by combining the features of a PDA with the features of a mobile telephone. These PDA/mobile telephone devices consolidate the mobile electronic device package by combining two devices into one. However, software application programs have yet to keep pace with these new devices. For example, in these devices, application programs for the mobile telephone features often operate independently from the application programs for the PDA features. As a result, the advantage of a PDA/mobile telephone device is still somewhat confined to merely a physical consolidation of two mobile electronic devices.

SUMMARY OF THE INVENTION

This invention is directed toward a computer-implemented system and method for creating a note in a mobile communication device based on context information about a current call. The method includes creating a call note if a phone call is in progress. The call note includes call data that is related to the phone call. The call note is also associated with an entry in a call log. According to one aspect of the invention, a trigger is provided in the entry of the call log so that the call note may be retrieved when the trigger is activated.

In one aspect, the invention is directed toward a computer-readable medium encoded with computer-executable components that include a dialer, a caller ID validator, a call log, a note application program, a note repository, and a handler. The handler creates call data by extracting information from the dialer or the caller ID validator. The handler also instructs the note application program to create a call note that includes the call data, and associates the call note with an entry in the call log.

In another aspect, the invention is directed toward a method of presenting and activating a trigger for creating a call note during a call. The method includes displaying a trigger on a graphical user interface for a dialer. The trigger is associated with a command for instructing a note application program to create a call note. The method also includes receiving an activation signal for the trigger through the user interface selection mechanism. In response to the activation signal for the trigger, the command is sent to the note application program.

In yet another aspect, the invention is directed toward a method of presenting and activating a trigger for reviewing a call note from an entry in a call log. The method includes displaying a trigger in an entry of a call log. The trigger is associated with a command for instructing a note application program to display a call note associated with the entry. The method also includes receiving an activation signal for the trigger through the user interface selection mechanism. In response to the activation signal for the trigger, the call note is retrieved and displayed.

DETAILED DESCRIPTION OF THE PREFERRED EMBODIMENT

This invention is directed toward a computer-implemented system and method for creating a note in a mobile communication device. The method includes creating a call note if a phone call is in progress. The call note includes call data that are related to the phone call. The call note is also associated with an entry in a call log. The method may be implemented by computer-executable components loaded into the memory of a mobile communication device. These and other aspects of the invention will become apparent to those skilled in the art from the following detailed description.

Illustrative Mobile Computing Device Implementing the Present Invention

Figure 1:
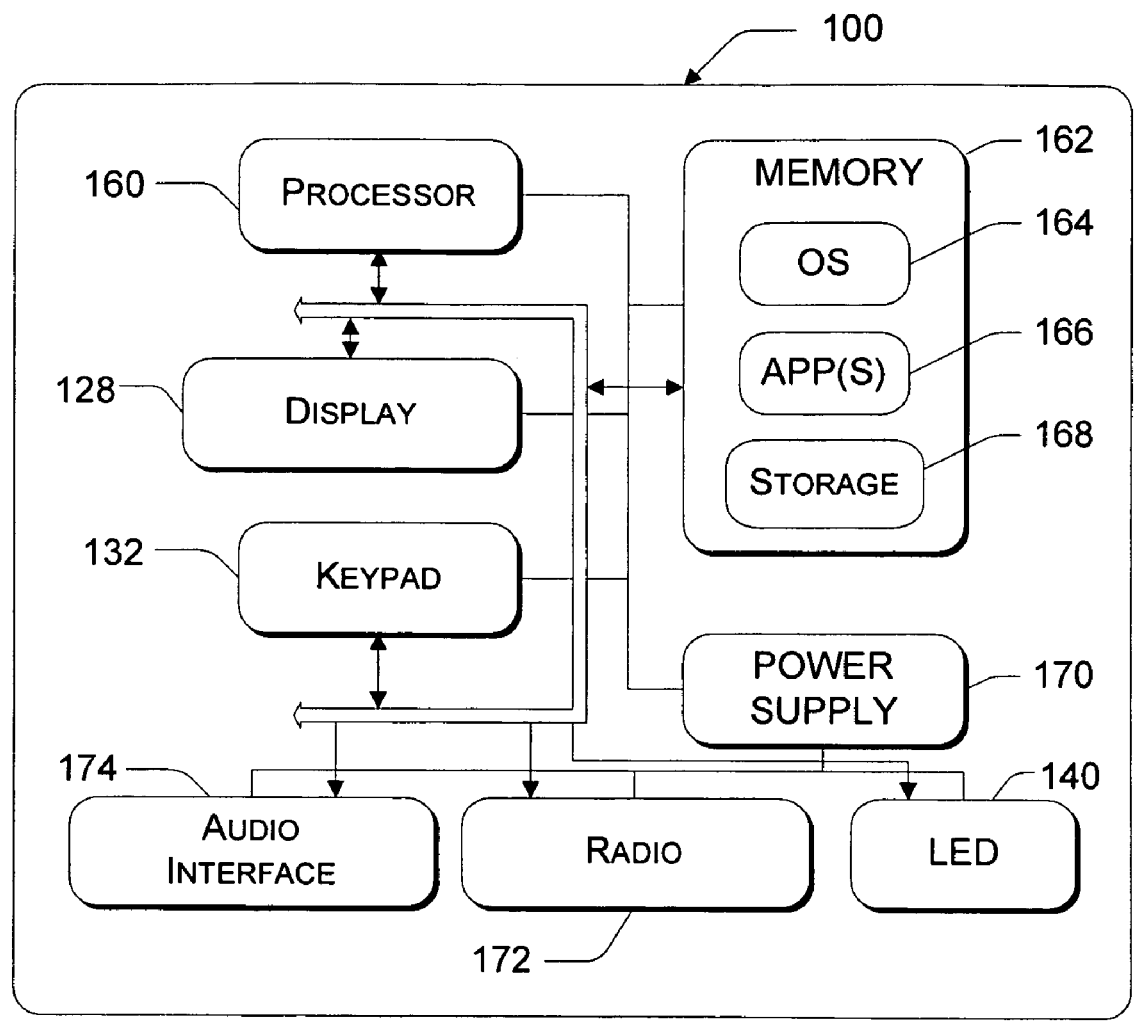
FIG. 1 is a functional block diagram illustrating functional components of a sample mobile device adapted for use in one implementation of this invention.

FIG. 1 is a functional block diagram illustrating functional components of a sample mobile device 100 adapted for use in one implementation of the present invention. Mobile device 100 has a processor 160, a memory 162, a display 128, and a keypad 132. Memory 162 generally includes both volatile memory (e.g., RAM) and non-volatile memory (e.g., ROM, Flash Memory, or the like). Mobile device 100 includes an operating system 164, which is resident in memory 162 and executes on processor 160. Keypad 132 may be a push button numeric dialing pad (such as on a typical telephone), a multi-key keyboard (such as a conventional keyboard). Display 128 may be a liquid crystal display, or any other type of display commonly used in mobile computing devices. Display 128 may be touch-sensitive, and would then also act as an input device.

One or more application programs 166 are loaded into memory 162 and run on operating system 164. Examples of application programs include phone dialer programs, e-mail programs, scheduling programs, PIM (personal information management) programs, word processing programs, spreadsheet programs, Internet browser programs, and so forth. Mobile device 100 also includes non-volatile storage 168 within the memory 162. Non-volatile storage 168 may be used to store persistent information which should not be lost if mobile device 100 is powered down. The applications 166 may use and store information in storage 168, such as e-mail or other messages used by an e-mail application, contact information used by a PIM, appointment information used by a scheduling program, documents used by a word processing application, and the like.

Mobile device 100 has a power supply 170, which may be implemented as one or more batteries. Power supply 170 might further include an external power source, such as an AC adapter or a powered docking cradle that supplements or recharges the batteries.

Mobile device 100 is also shown with two types of external notification mechanisms: an LED 140 and an audio interface 174. These devices may be directly coupled to power supply 170 so that when activated, they remain on for a duration dictated by the notification mechanism even though processor 160 and other components might shut down to conserve battery power. LED 140 may be programmed to remain on indefinitely until the user takes action to indicate the powered-on status of the device. Audio interface 174 is used to provide audible signals to and receive audible signals from the user. For example, audio interface 174 may be coupled to a speaker for providing audible output and to a microphone for receiving audible input, such as to facilitate a telephone conversation.

Mobile device 100 also includes a radio 172 that performs the function of transmitting and receiving radio frequency communications. Radio 172 facilitates wireless connectivity between the mobile device 100 and the outside world, via a communications carrier or service provider. Transmissions to and from the radio 172 are conducted under control of the operating system 164. In other words, communications received by the radio 172 may be disseminated to application programs 166 via the operating system 164, and vice versa.

The radio 172 allows the mobile device 100 to communicate with other computing devices, such as over a network. The radio 172 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
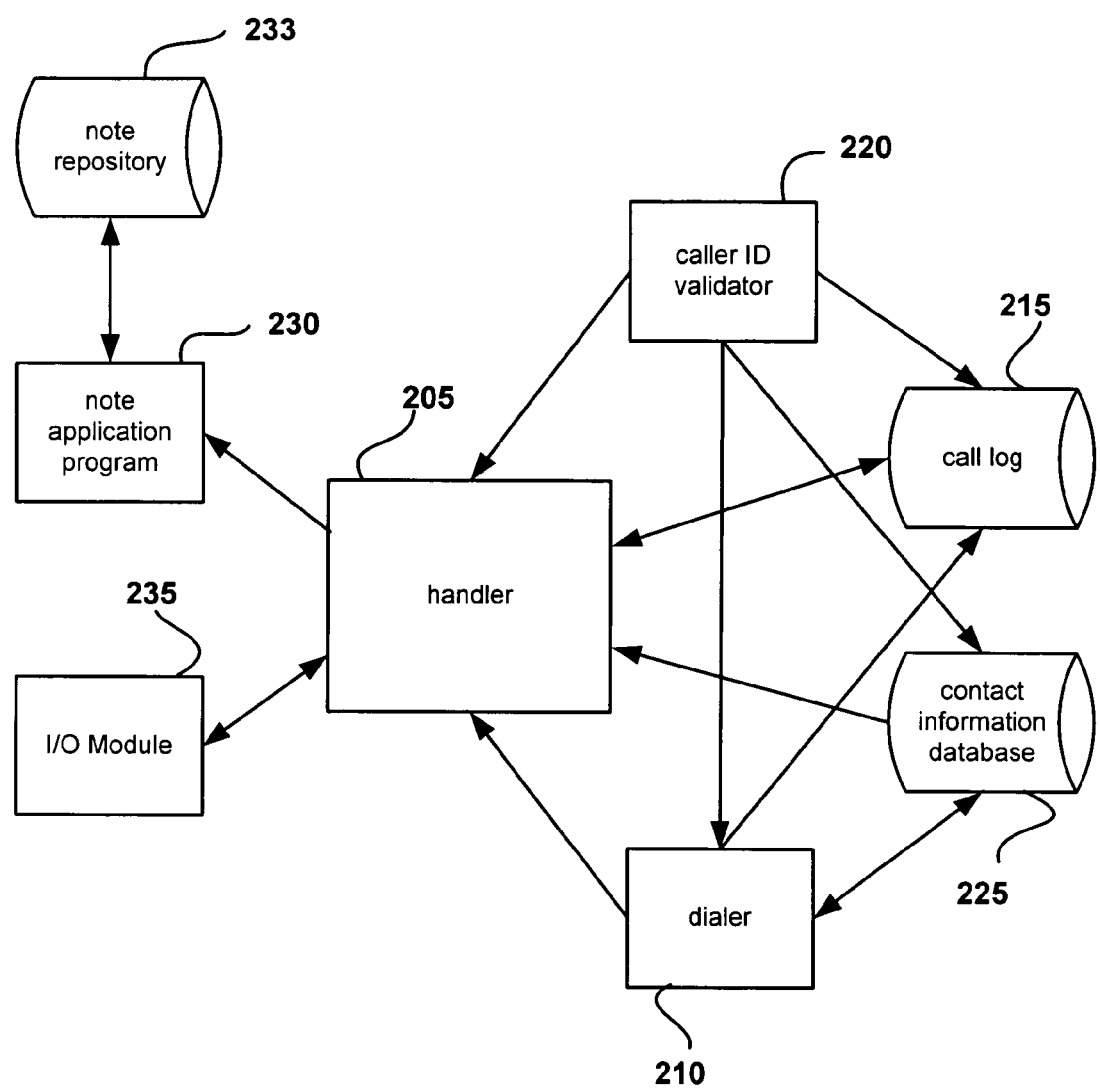
FIG. 2 is a block diagram of software components of mobile device of FIG. 1 that implement this invention.

FIG. 2 is a block diagram of software components of mobile device 100 of FIG. 1 that implement this invention. Illustrated is a handler 205, which is a software component of mobile device 100. When in use, handler 205 may be implemented as part of operating system 164 or as one of the applications 166 shown in FIG. 1. Handler 205 may also be stored in storage 168 when it is not in use.

Handler 205 may interact with other components in mobile device 100. For example, handler 205 may obtain call data from the software components that have such data. Call data will be discussed in conjunction with note application program 230. Briefly stated, call data are data related to a particular phone call.

One of the software components with which handler 205 may interact is dialer 210. Dialer 210 is responsible for making outgoing phone calls for mobile device 100. For example, dialer 210 may be instructed by a user to make an outgoing phone call to a particular phone number. Dialer 210 may make the phone call by providing the number to and requesting a wireless phone connection from a communication carrier or service provider through radio 172. When the wireless connection is established, dialer 210 may make the connection available to handler 205.

Dialer 210 may also store phone call information, which are information related to the callee and the phone call. Phone call information may include phone number, date, time, call duration, service provider used, etc. Dialer 210 may store the phone call information in call log 215. In addition, dialer 210 may display the phone call information on display 128 for viewing by a user. When an incoming call is received, dialer 210 may also display caller information obtained from caller ID validator 220 and contact information database 225.

Another software component with which handler 205 may interact is caller ID validator 220. Caller ID validator 220 is a component in mobile device 100 for obtaining information about the caller of an incoming phone call. A communication carrier or service provider may provide caller information to the callee of a phone call if such information is available. Caller information may include the caller's phone number, the name of the caller, etc. The information is transmitted to the callee before the callee answers the phone call.

When a caller attempts to call mobile device 100, caller ID validator 220 receives and decodes the caller information of the phone call before mobile device 100 answers the phone call. Caller ID validator 220 may provide the caller information to other software components of mobile device 100, including handler 205, call log 215, and contact information database 225. Caller ID validator 220 may also notify handler 205 that an incoming call is being received, and store call-related information in call log 215.

Handler 205 may also interact with call log 215. Call log 215 is an information database that contains a record of incoming and outgoing calls made by mobile device 100. Each call is recorded as an entry in call log 215. Call log 215 may be initialized by discarding existing entries of telephone calls. An entry in call log 215 contains phone call information of a particular call that was made or received since the last time that call log 215 was initialized. Call log 215 may obtain the phone call information from dialer 210 for an outgoing call or from caller ID validator 220 for an incoming call, or any other source. In additional to handler 205, any one of the application programs 166, as previously shown in FIG. 1, may have programmatic access to call log 215 through an application program interface (API).

Handler 205 may interact with contact information database 225. Contact information database 225 contains information related to a contact, such as people and businesses with whom mobile device 100 may directly communicate. Contact information database 225 may also contain information related to a contact for record keeping purposes. Contact information database may obtain contact information from user inputs, dialer 210, or caller ID validator 220.

Contact information database 225 may organize the contact information for each contact by separating the information of the contact into associated data fields. These data fields may include phone numbers, e-mail address, street address, and other information related to the contact. Other components may retrieve contact information related to a particular caller or callee by searching the contact information database 225. For example, handler 205 may search in the field of phone numbers for a particular phone number, and retrieve the name of the contact associated with that phone number. Handler 205 may incorporate the name of the contact in call data.

Handler 205 may also interact with note application program 230. Note application program 230 is a software component of mobile device 100. Note application program 230 may create, modify, store, and retrieve notes. Handler 205 may instruct note application 230 to create either a regular note or a call note. A regular note may contain a variety of information such as text, graphics, sound, etc. A call note is a special kind of note that includes call data pre-populated by handler 205.

Call data are data that describe a particular phone call. Handler 205 may compile the call data from phone call information from the dialer 210 or call log 215, caller information from caller ID validator 220, and contact information from contact information database 225. The call data may include name of the caller, phone number, time and duration of the call, etc.

Handler 205 may provide the call data to any one of application programs 166. These programs may include third party application programs. In one embodiment of this invention, handler 205 provides call data to note application program 230 for creating a call note.

A call note may be stored in note repository 233 by note application program 230. Storing of a call note will be discussed in conjunction with FIGS. 6 and 7. Briefly stated, a call note may be stored in one of the directories in note repository 233, and associated with an entry in the call log 215. Any one of the application programs 166 may have programmatic access to note repository 233 through an API.

Handler 205 may interact with I/O module 235. I/O module 235 acts as an interface between handler 205 and the various hardware components of the mobile device 100, such as the radio 172, the audio interface 174, and the like.

Figure 3:
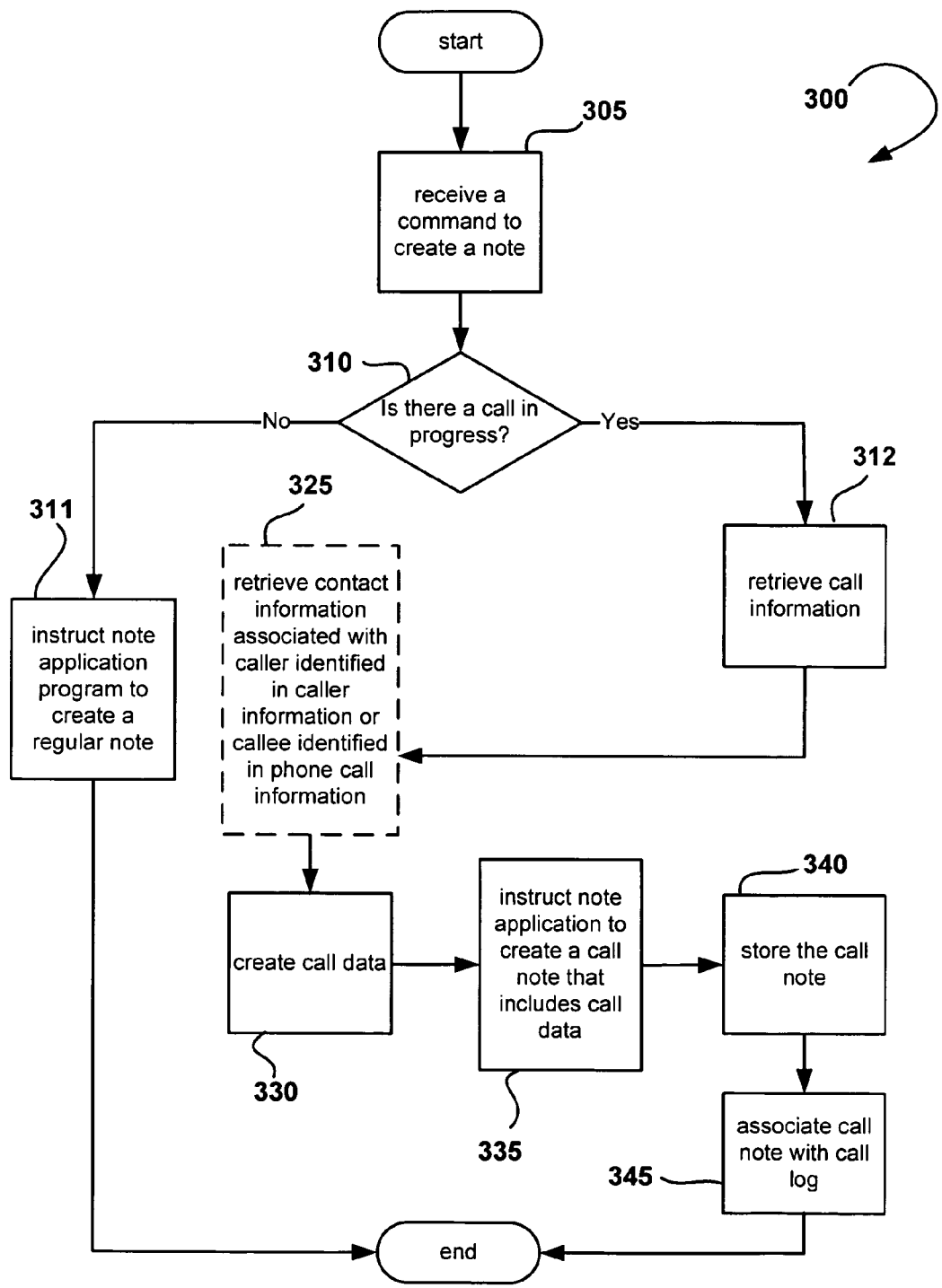
FIG. 3 is a functional block diagram generally illustrating an exemplary process that may be employed by the handler shown in FIG. 2.

FIG. 3 is a functional block diagram generally illustrating an exemplary process 300 that may be employed by the system shown in FIG. 2 to implement the present invention. Process 300 begins at block 305 when handler 205 receives a command to create a note. The command may be given by one of the application programs 166 in mobile device 100 shown in FIG. 1, such as dialer 210 shown in FIG. 2. It is envisioned that an icon may be displayed on screen during a phone call allowing the user to issue the command to create a note.

At decision block 310, a determination is made whether there is a phone call in progress. Handler 205 may make this determination by receiving notification from dialer 210 that an outgoing call is being made, or from caller ID validator 220 or I/O module 235 that an incoming call is being received. If no call is in progress, process 300 goes to block 311 where handler 205 instructs note application program 230 to create a regular note, as discussed above in conjunction with FIG. 2.

Returning to decision block 310, if a phone call is in progress, process 300 continues to block 312, where the handler 205 retrieves phone call information from a data store in which caller ID validator 220 and the dialer 210 store such information. Alternatively, the handler 205 may get phone call information directly from dialer 210 or from caller ID validator 220, shown in FIG. 2.

From block 312, process 300 continues to optional block 325. At block 325, handler 205 may retrieve contact information from contact information database 225 shown in FIG. 2. The contact information may be associated with the callee phone number identified by the phone call information from dialer 210, or the name or phone number of the caller identified by the caller information from caller ID validator 220. The operation at block 325 is optional (as indicated by the dashed line box) and may be omitted without affecting the invention.

At block 330, handler 205 creates call data by extracting data about the current phone call in progress from among the phone call information from dialer 210, caller information from caller ID validator 220, and, optionally, contact information from contact information database 225.

At block 335, handler 205 instructs note application program 230 (shown in FIG. 2) to create a call note that includes the call data. An exemplary call note will be described in conjunction with FIG. 5. Briefly stated, a call note is a note that is pre-populated with the call data and associated with an entry in the call log.

At block 340, handler 205 instructs note application 230 to store the note. The storing of call note will be discussed in conjunction with FIGS. 6 and 7. Briefly stated, the call note is stored with a filename and in a directory that would facilitate the searching and retrieving of the call note at a later time.

At block 345, handler 205 associates the call note with the corresponding entry in call log 215 shown in FIG. 2. The associating of a call note with an entry in call log 215 will be discussed in conjunction with FIG. 8. Briefly stated, handler 205 associates the call note with the corresponding entry in call log 215 to facilitate the retrieval of the call note.

Figure 4:
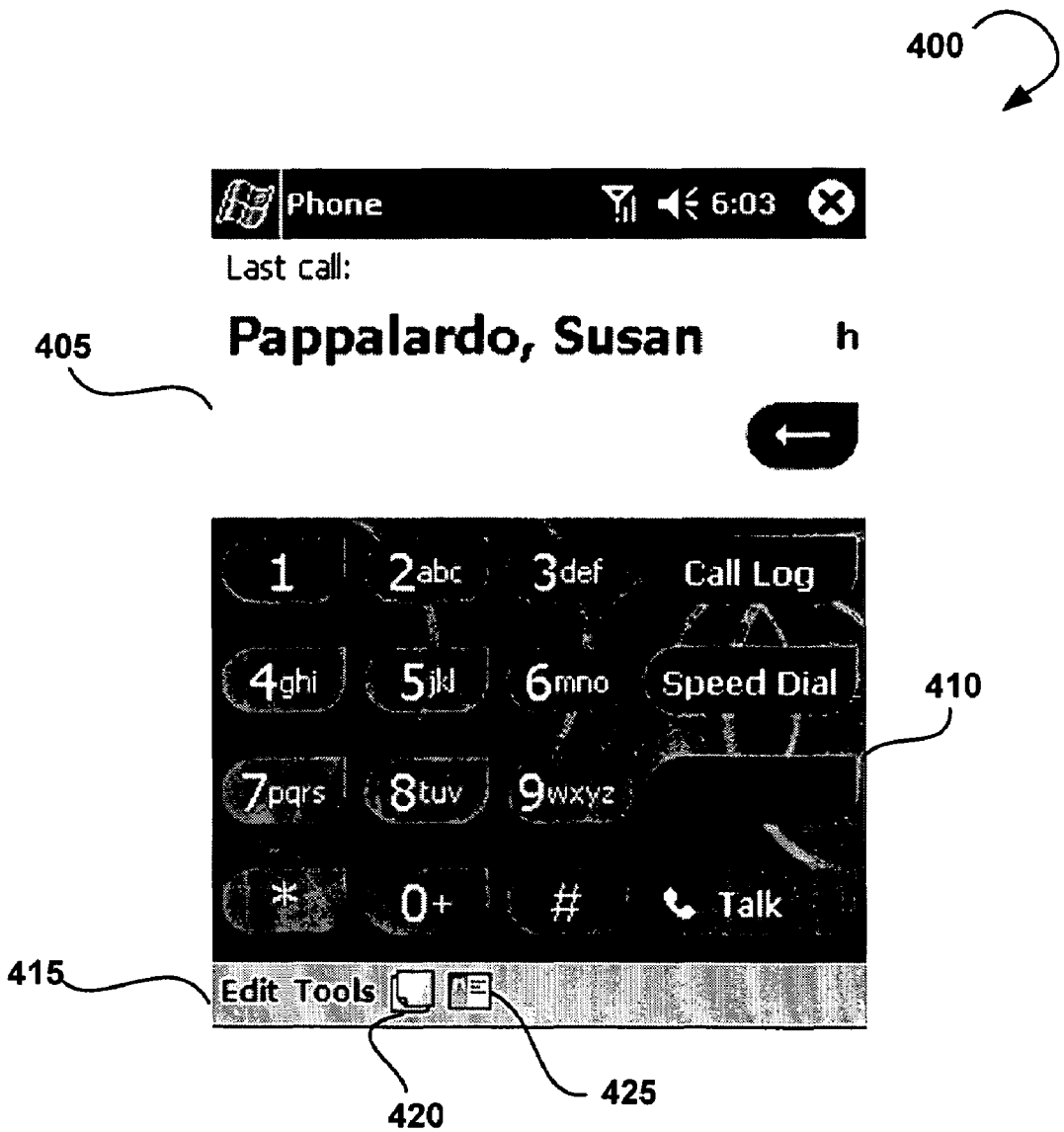
FIG. 4 is a screen shot of an exemplary user interface for the dialer shown in FIG. 2.

FIG. 4 is a screen shot of an exemplary user interface (UI) for dialer 210 shown in FIG. 2. Illustrated is a dialer UI 400 that includes an information display 405, a keypad 410, and a tool bar 415. The information display 405 may present pertinent information about a phone call. Information display 405 as illustrated in FIG. 4 shows that the last call was made to Susan Pappalardo. Information display 405 may present other information, such as the number dialed, the status of the call, etc.

Keypad 410 allows a user to enter a phone number to which mobile device 100 is to be connected. Keypad 410 also allows a user to access a speed dial feature and a call log UI. The call log UI will be described in conjunction with FIG. 8. Briefly stated, the call log UI allows a user to view a call log that includes a record of outgoing and incoming calls.

Tool bar 415 of dialer UI 400 may display a trigger for a command to an application program. A trigger enables a user to send a command to a particular application program by activating the trigger. Dial UI 400 has two exemplary triggers: note icon 420 and contact information database icon 425. Note icon 420, when activated (e.g., clicked on or pressed), sends a command for creating a call note to note application program 230 if a phone call is in progress. When contact information database icon 425 is activated, it sends a command for activating an application program associated with contact information database 225.

Figure 5:
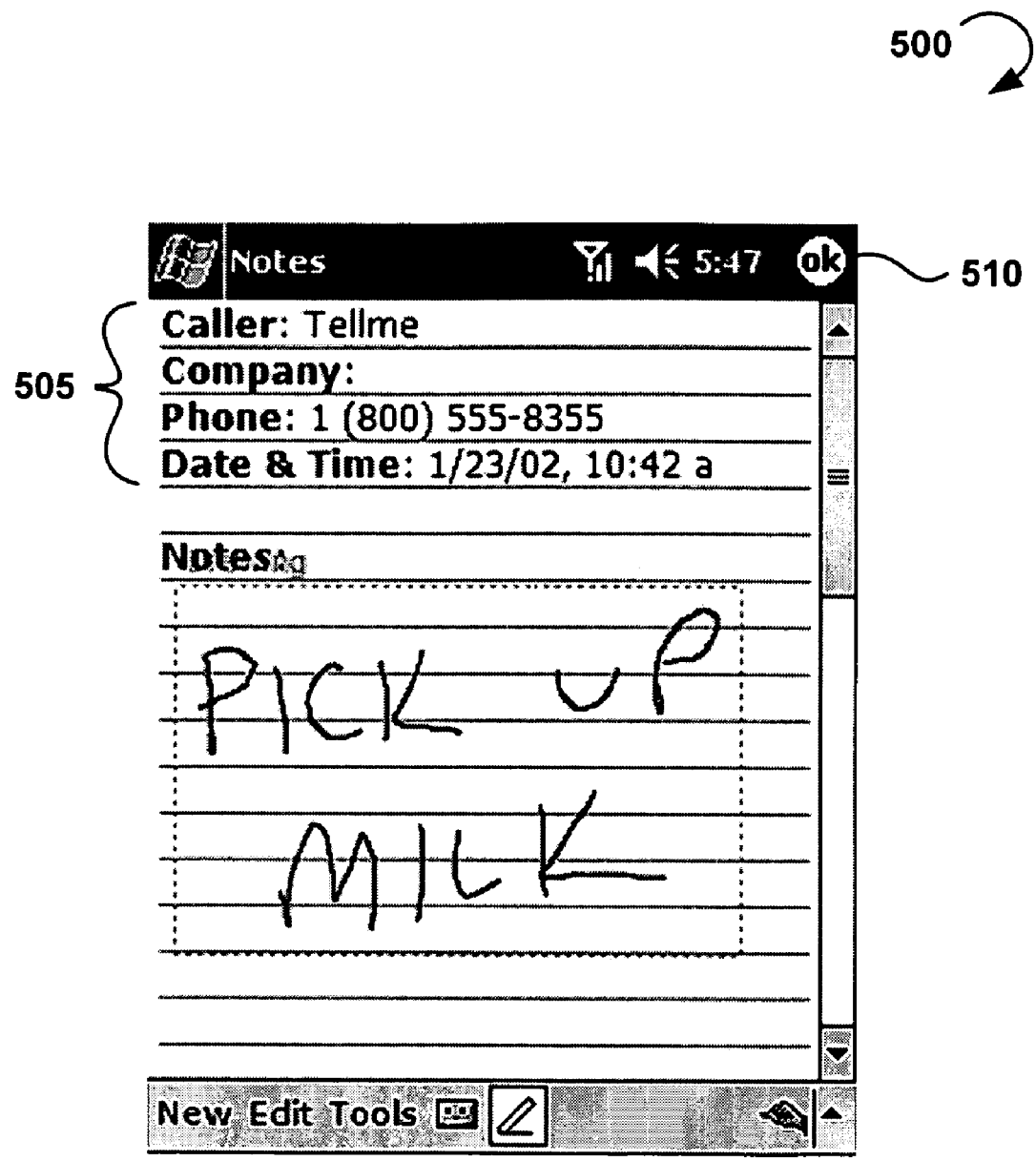
FIG. 5 shows a screen shot of an exemplary UI for the note application program shown in FIG. 2.

FIG. 5 shows a screen shot of an exemplary UI for note application program 230 shown in FIG. 2. Illustrated is a note application program UI 500 that displays a call note. The displayed call note includes a header 505. The header of a call note may include call data, as discussed previously in conjunction with FIG. 2 and FIG. 3. Header 505 of FIG. 5 includes fields for the name (optionally) of the caller or callee, a company associated with the caller or callee, the phone number of the phone call, and the date and time of the phone call. Although blank in this example, the company information of the call may be included in header 505 if such information is available as call data. The call data may include other information, which could also be included in the header of the call note or elsewhere.

Note application program UI 500 also displays a trigger for a note storing command, which is displayed as an "OK" icon button 510. When selected, the "OK" icon button sends the command to note application program 230 to store the call in memory. Storing the call note will be discussed in conjunction with FIGS. 6 and 7. Briefly stated, the call note may be stored at a designated directory under a filename that is related to the phone call for which the note was created.

Figure 6:
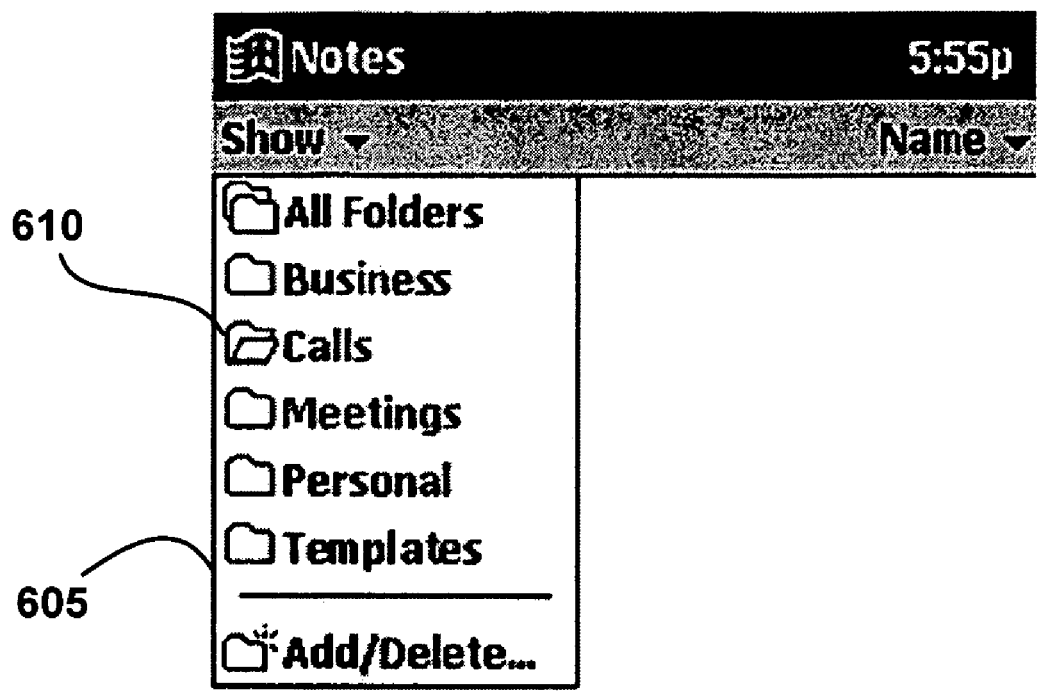
FIG. 6 shows another screen shot of the note application program UI shown in FIG. 5.
Figure 6:

FIG. 6 shows another screen shot of the note application program UI 500 shown in FIG. 5. Note application UI 500 includes a pull down menu 605, which displays a list of directories (e.g., folders) where a note may be stored. The list of folders include a "Calls" folder 610. When a call note is stored as discussed in conjunction with FIG. 5, the call note is stored in "Calls" directory 610. At a later time, when a user wants to retrieve a particular call note, the user may search in "Calls" folder 610 for the call note, instead of searching through all of the folders where a note may be stored.

Figure 7:
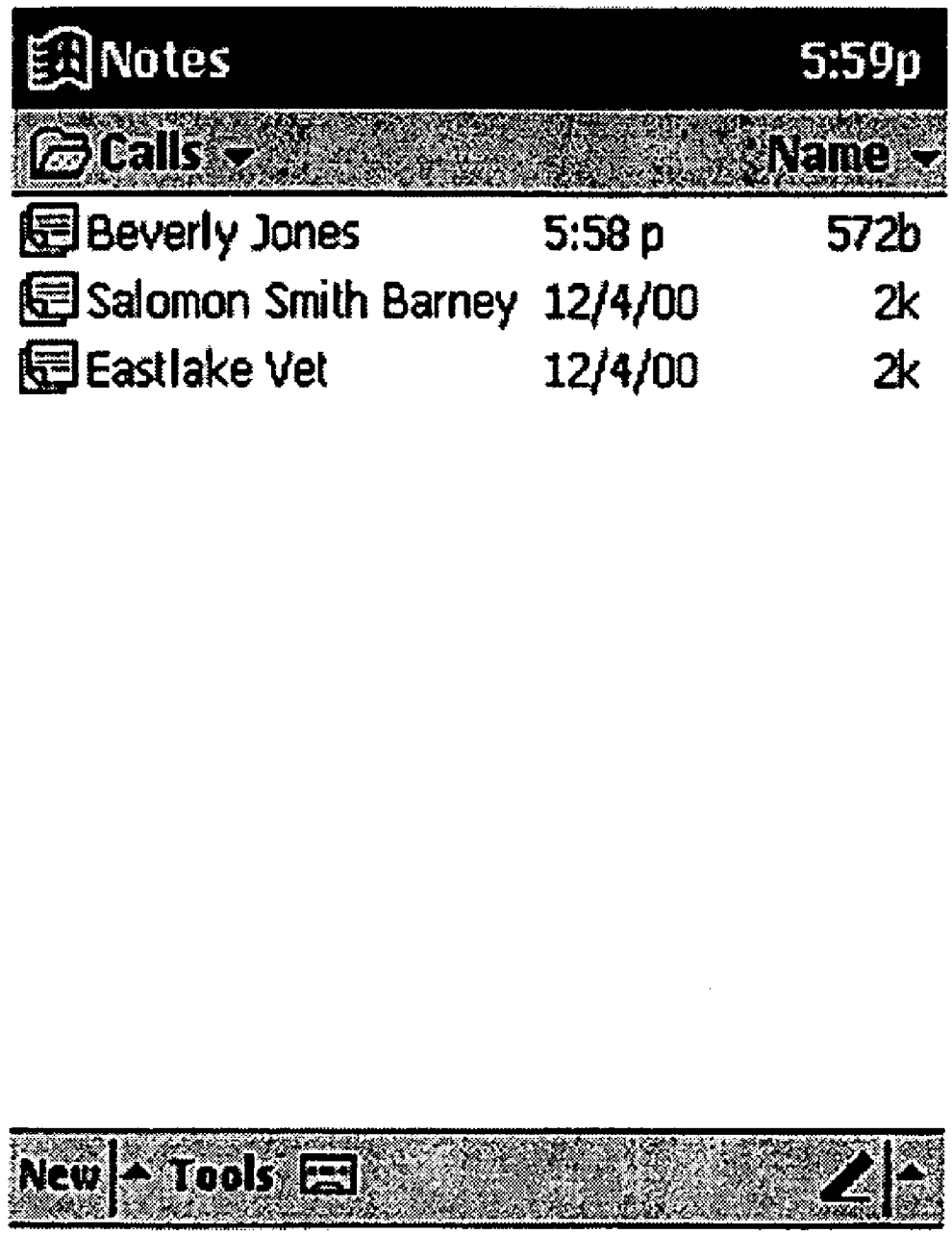
FIG. 7 shows a screen shot of the note application program UI for displaying the contents of "Calls" folder shown in FIG. 6.

FIG. 7 shows a screen shot of the note application program UI 500 for displaying the contents of "Calls" folder 610 shown in FIG. 6. The contents of "Calls" folder 610 include three call notes. The call notes may be listed by filename, date or time when the call notes were created or last modified, size of the call notes, etc. Each call note may be named after the caller of the phone call for which the call note was created. If the name of the caller is not available, the call note may be named after other information in the call data, such as the phone number, the time and date of the phone call, etc. A user may also modify the filename of a call note if desired.

Figure 8:
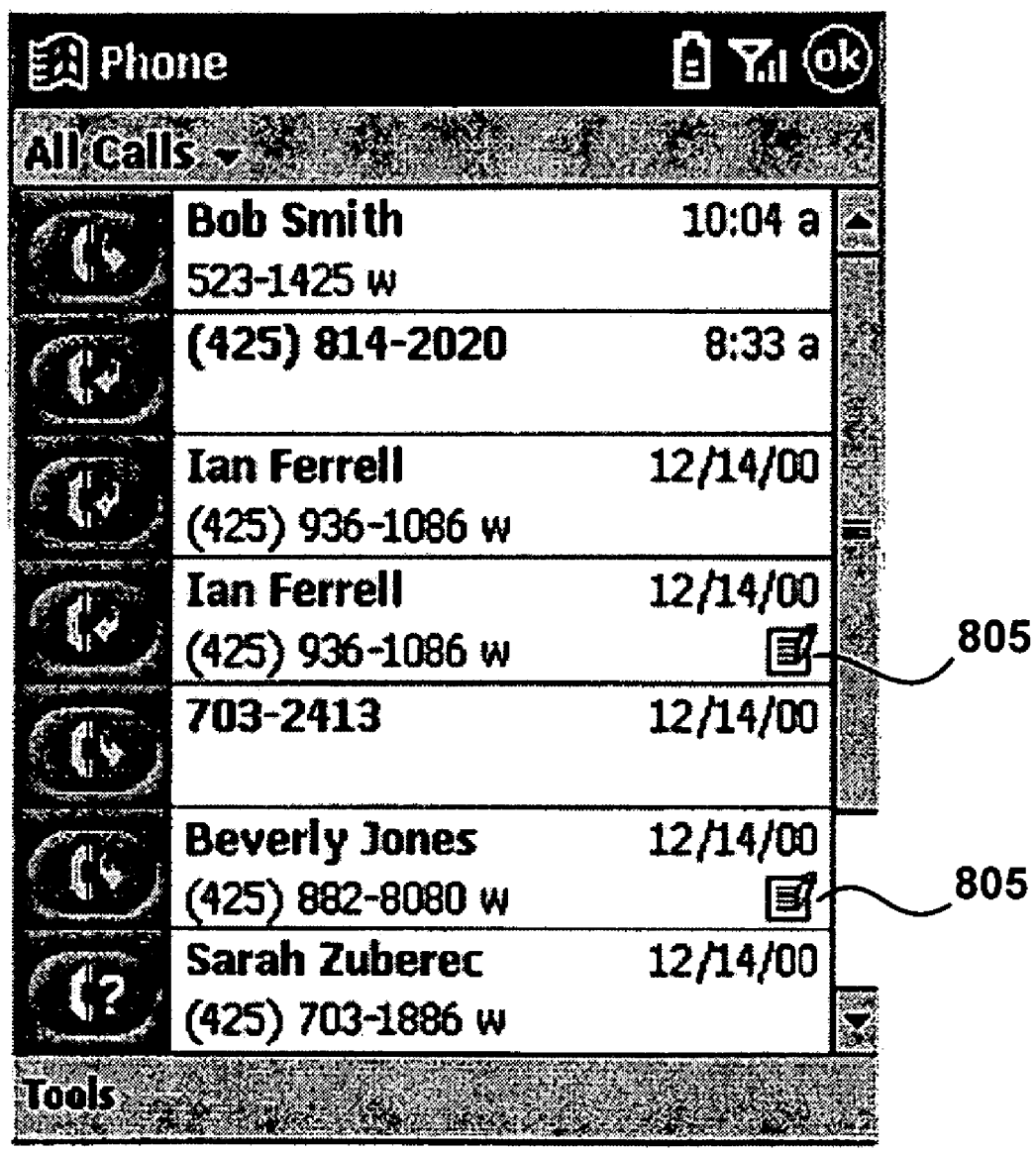
FIG. 8 shows a screen shot of a dialer UI shown in FIG. 4 for displaying a call log, such as the call log shown in FIG. 2.

FIG. 8 shows a screen shot of the dialer UI 400 shown in FIG. 4 for displaying a call log, such as call log 215 shown in FIG. 2. The call log includes a number of entries. Each entry contains phone call information corresponding to a phone call. Phone call information for each entry may include the name of the caller or callee, phone number, the type of phone number (e.g., work, home, etc), the date or time of the phone call, and the duration of the call.

Dialer UI 400 may also display a trigger for a command for note application program 230 to retrieve a call note associated with a particular entry in the call log. The trigger, shown as a note icon 805, provides an indication that there is a call note associated with the phone call and allows a user to retrieve the call note. When activated, note icon 805 sends a command to note application program 230 to display the call note using note application program UI 500, as shown in FIG. 5.

The above specification, examples and data provide a complete description of the invention. Since many embodiments of the invention can be made without departing from the spirit and scope of the invention, the invention resides in the claims hereinafter appended.

We claim:

1. A computer-readable medium encoded with computer-executable components for integrating a personal digital assistant component of a mobile device with a mobile telephone component of the mobile device, comprising:
   a dialer, associated with the mobile telephone component, for making outgoing phone calls;
   a caller ID validator, associated with the mobile telephone component, for receiving information relating to incoming phone calls;
   a call log, associated with the mobile telephone component, for recording the incoming and outgoing phone calls, wherein each call has a corresponding entry in the call log;
   a note application program, associated with the personal digital assistant component, for creating notes;
   a note repository, associated with the personal digital assistant component, for storing the notes; and
   a handler for integrating the mobile telephone component and the personal digital assistant component, wherein the handler is configured to:
      transfer call data associated with the mobile telephone component to the personal digital assistant component;
      instruct the note application program of the personal digital assistant component to create a call note that includes the call data;
      store the call note in a note repository associated with the personal digital assistant component; and
      associate the call note with an entry in the call log so that the call note is accessible from the mobile telephone component.

2. The computer-readable medium of claim 1, further comprising: a contact information database for storing contact information, wherein the handler creates the call data by extracting data from the contact information database.

3. The computer-readable medium of claim 1, wherein the dialer includes a trigger for prompting the handler to instruct the note application programs to generate a call note.

4. The computer-readable medium of claim 1, wherein the dialer includes a trigger for prompting the handler to store the call note in the note repository and associate the call note with an entry in the call log.

5. The computer-readable medium of claim 1, wherein the call log includes a trigger for prompting the handler to retrieve the call note from the note repository.

6. The computer-readable medium of claim 1, wherein the dialer includes a first trigger for prompting the handler to instruct the note application program to generate a call note, wherein the dialer includes a second trigger for prompting the handler to store the call note in the note repository and associate the call note with an entry in the call log, and wherein the call log includes a trigger for prompting the handler to retrieve the call note from the note repository.

7. The computer-readable medium of claim 1, wherein the call note is accessible from the call log.

8. A computer-readable medium encoded with a plurality of data structures for integrating a personal digital assistant component of a mobile device with a mobile telephone component of the mobile device, comprising:

a first data structure including:
  a first data field, associated with the personal digital assistant component, representing a note;
  a second data field, associated with the mobile telephone component, containing data related to a phone call; and
a second data structure including:
  entries, associated with the mobile telephone component, containing data representing multiple phone calls including an entry corresponding to the phone call; and
  a third data field associating the entry of the mobile telephone component with the note of the personal digital assistant component.

9. The computer-readable medium of claim 8, wherein the data related to the phone call includes a phone number.

10. The computer-readable medium of claim 8, wherein the data related to the phone call includes a time of the phone call.

11. The computer-readable medium of claim 8, wherein the data related to the phone call includes a duration of the phone call.

12. The computer-readable medium of claim 8, further comprising a fourth data field representing a dialer.

13. The computer-readable medium of claim 12, further comprising a fifth data field associating a dialer with the call note.

14. The computer-readable medium of claim 13, further comprising a trigger for prompting the association of the entry with the note.

15. A computer-readable medium encoded with computer-executable components for integrating a personal digital assistant component of a mobile device with a mobile telephone component of the mobile device, comprising
  a dialing means, associated with the mobile telephone component, wherein the dialing means is configured to make phone calls;
  a validator means, associated with the mobile telephone component, wherein the validator means is configured to receive incoming call information;
  a logging means, associated with the mobile telephone component, wherein the logging means is configured to record calls and associate each call with an entry;
  a note means, associated with the personal digital assistant component, wherein the note means is configured to create notes;
  a repository means, associated with the personal digital assistant component, wherein the repository means is configured to store notes; and
  a handler means for integrating the mobile telephone component and the personal digital assistant component, wherein the handler means is configured to:
    transfer call data associated with the mobile telephone component to the personal digital assistant component;
    instruct the note means of the personal digital assistant component to create a call note that includes the call data;
    store the call note in the repository means associated with the personal digital assistant component; and
    associate the note means with an entry in the logging means so that the note means is accessible from the mobile telephone component.

16. The computer-readable medium of claim 15, further comprising a first trigger means, wherein the first trigger means is configured to prompt the handler means to instruct the note means to generate a call note.

17. The computer-readable medium of claim 16, further comprising a second trigger means, wherein the second trigger means is configured to prompt the handler means to store the call note in the repository means and associate the call note with an entry in the logging means.

18. The computer-readable medium of claim 17, further comprising a third trigger means, wherein the third trigger means is configured to prompt the handler means to retrieve the call note from the repository means.

19. The computer-readable medium of claim 15, wherein the call note is accessible from the logging means.

* * * * *